Aug. 10, 1965   R. S. PHILLIPS   3,200,406
SPECTACLE FRAMES AND INTERCHANGEABLE BROW-PIECES THEREFOR
Filed May 10, 1961

United States Patent Office 3,200,406
Patented Aug. 10, 1965

3,200,406
SPECTACLE FRAMES AND INTERCHANGEABLE
BROW-PIECES THEREFOR
Ronald Sidney Phillips, 207 Burnt Ash Hill,
London SE. 12, England
Filed May 10, 1961, Ser. No. 109,024
Claims priority, application Great Britain, May 11, 1960,
16,704/60
1 Claim. (Cl. 351—52)

The invention relates to spectacle frames and to interchangeable brow-pieces therefor.

It is known to provide interchangeable ornamental brow-pieces—sometimes known as "decorative trims" or "attachment pieces"—on the front faces of those parts of the frame above the eyes.

The means by which such brow-pieces or trims are removably secured to the frame are cumbersome and complicated and add considerably to the cost of the frame.

The invention has among its objects to provide brow-pieces for spectacle frames which can be easily interchanged, applied and removed, and which are held in position by means which are readily secured to the frame without substantial increase to the cost of the frame.

According to the invention the brow-piece or trim is formed with an engaging element which is received in a cavity extending lengthwise of the spectacle frame, the element being so constructed that the brow-piece or trim is presented on the front face of the frame and is prevented from movement relatively to the frame, whereby the brow-pieces or trims are readily interchangeable.

Thus the brow-piece or trim may be moulded, pressed, milled, or otherwise conveniently formed from acrylic plastic, or other plastic or from other material such as metal to provide the desired design or shape, and to the required colour, and with a metal pin secured to the rear of the brow-piece or trim advantageously in the molding operation, the pin extending lengthwise of the brow-piece or trim in the manner of the clasp or pin of a brooch or the like, to be received in a cavity extending lengthwise through the frame from the end thereof to open into a position in the inner face, the pin being bent or otherwise formed to snap into the end of the cavity in the inner face so that the pin and attached brow-piece or trim are removably retained on the frame. It will be understood that a brow-piece or trim is removably secured on each side of the nose-piece of the frame.

The frame and the interchangeable brow-piece or trim are advantageously provided of such shape that the brow-pieces or trims substantially completely cover the front of those parts of the frame between the nose-piece and the sides.

The invention is diagrammatically illustrated by way of example in the accompanying drawings, in which.

Figure 1:
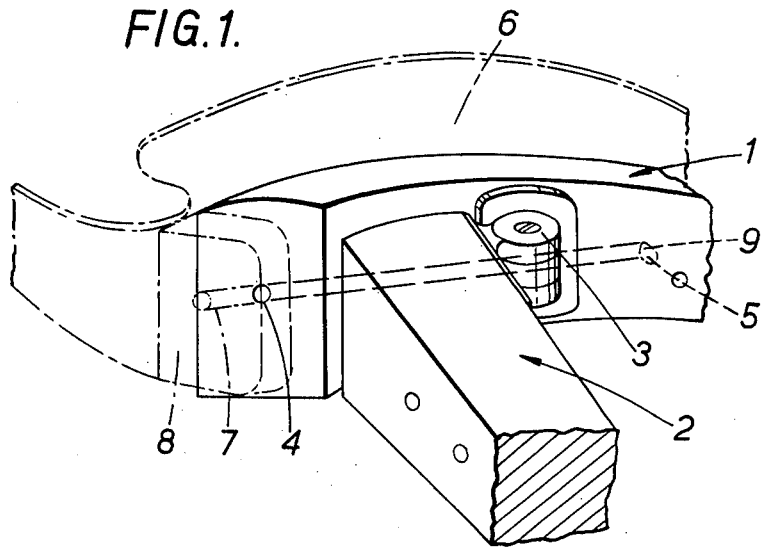
FIGURE 1 is a perspective view of that part of the frame pivotally connected to a side.
Figure 2:
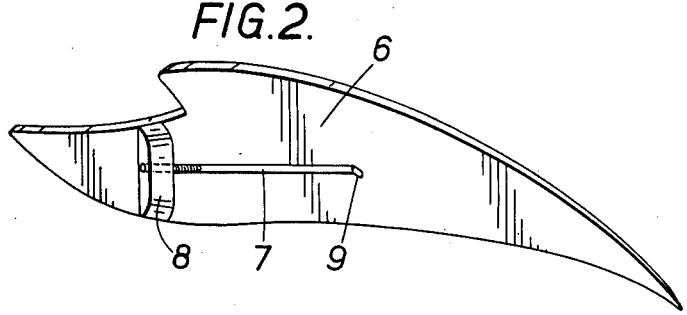
FIGURE 2 is a rear view of a brow-piece or trim provided with an engaging element according to the invention.

1 is the frame; 2 the side, 3 the pivotal means connecting the end of the frame to the side, 4 is the cavity or boring extending lengthwise from the end of the frame to open out with a slight inner bend at 5 in the inner face of the frame 1.

6 is the brow-piece or trim and 7 the metal pin or engaging element moulded at one end into a block or base 8 formed on the rear face of the trim and extending lengthwise and parallel to the trim. The other end 9 of the element 7 is advantageously slightly pointed and bent so as to project into the bent part of the boring at the outlet position 5 in the inner face of the frame 1.

Figure 3:
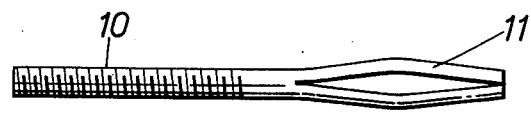
FIGURE 3 is a perspective view of a modified construction of pin.

In a modified construction of the pin 7, as illustrated in FIGURE 3, the pin may be externally screw-threaded at one end at 10 for screw-threaded engagement in the block or base 8, and at the other end 11, split to form two arms which are bent to form an intermediate outward bulge so as to engage the walls of the boring with spring action.

I claim:

A spectacle construction comprising: a lens-supporting frame having an upper rim portion adapted to be secured to the upper edge of a lens; a bow hingedly secured to said frame adjacent one end of said upper rim portion; an elongated brow-piece disposed in front of said upper rim portion and extending lengthwise therealong; said upper rim portion having an elongated cavity therein extending lengthwise thereof, said cavity opening through said one end of said upper rim portion; a base mounted on the rear face of said brow-piece and projecting rearwardly therefrom, said base being disposed adjacent and opposed to said one end of said upper rim portion; an elongated pin secured at one end thereof to said base, the remainder of said pin being free from connection to said brow-piece and extending lengthwise of said brow-piece behind the rear face thereof, said pin extending into and lengthwise along said cavity; and a locking device carried by said pin and disposed in said cavity and releasably securing said pin and thereby said brow-piece to said upper rim portion.

References Cited by the Examiner

UNITED STATES PATENTS

| 2,042,400 | 5/36 | Hon | 88—52 |
| 2,674,158 | 4/54 | Curtet | 88—41 |
| 2,682,724 | 7/54 | Pattillo | 88—41 |
| 2,803,994 | 8/57 | De Angelis et al. | 88—41 |

FOREIGN PATENTS

| 1,131,277 | 10/56 | France. |
| 1,163,413 | 9/58 | France. |
| 1,188,346 | 9/59 | France. |
| 466,034 | 5/37 | Great Britain. |
| 682,352 | 11/52 | Great Britain. |

DAVID H. RUBIN, *Primary Examiner.*

EMIL G. ANDERSON, JEWELL H. PEDERSEN,
*Examiners.*